US005863155A

United States Patent [19]

Segota

[11] Patent Number: 5,863,155

[45] Date of Patent: Jan. 26, 1999

[54] BOUNDARY AIR/LAMINAR FLOW CONVEYING SYSTEM

[76] Inventor: Darko Segota, 4961 S. Murray Blvd. #P31, Murray, Utah 84123

[21] Appl. No.: 446,054

[22] Filed: May 19, 1995

[51] Int. Cl.[6] .................. B65G 53/08

[52] U.S. Cl. .................. 406/61

[58] Field of Search .................. 406/56, 61, 144, 406/153

[56] References Cited

U.S. PATENT DOCUMENTS

| | | | |
|---|---|---|---|
| 1,578,954 | 3/1926 | Caracristi | 406/61 |
| 1,614,713 | 1/1927 | Caracristi | 406/61 |
| 2,127,693 | 8/1938 | McCanless et al. | 406/61 |
| 2,299,565 | 10/1942 | Colburn | 406/61 |
| 2,315,079 | 3/1943 | Reeves . | |
| 2,614,892 | 10/1952 | Cherewick | 406/61 |
| 3,377,107 | 4/1968 | Hodgson . | |
| 4,391,561 | 7/1983 | Smith et al. | 406/61 |
| 4,500,228 | 2/1985 | McDonald et al. . | |
| 4,711,607 | 12/1987 | Wynosky et al. . | |
| 4,851,110 | 7/1989 | Rolle et al. | 406/61 |
| 5,558,473 | 9/1996 | Lindahl | 406/61 |

FOREIGN PATENT DOCUMENTS

| | | |
|---|---|---|
| 1172671 | 8/1984 | Canada . |
| 0 094 811 | 11/1983 | European Pat. Off. . |
| 0 099 653 | 2/1984 | European Pat. Off. . |
| 613 056 | 4/1935 | Germany . |
| 27 29 863 | 1/1978 | Germany . |
| 537009 | 12/1976 | U.S.S.R. . |

OTHER PUBLICATIONS

Study of Pneumatic Conveying Systems Utilizing Laminar Flow/Boundar Air Technology in Loading, Discharging or Transfer of Cargo on U.S. Bulk Carriers, U.S. Department of Transportation—Maritime Administration, Contract No. DTMA91–83–C–30058, Report No. 84052, Oct. 30, 1984.

*Primary Examiner*—Gary C. Hoge
*Attorney, Agent, or Firm*—Thorpe, North & Western, L.L.P.

[57] ABSTRACT

A system for conveying particulate material from a first location to a second location. The system includes an auger rotatably disposed in a cylindrical auger chamber having a discharge end coupled to an inwardly-tapering nose cone. The nose is attachable to an elongate conveying conduit for conveying the particulate material. First and second plenum chambers co-act to inject concentric annular waves of pressurized fluid into the nose cone at an entry point adjacent to the discharge end of the nose cone. The arrangement provides a substantially laminar gas layer which lines the interior surface of the conveying conduit and circumscribes a flowing stream of gas and particulate material to thereby minimize contact of the particulate material with the interior surface of the conveying conduit.

64 Claims, 4 Drawing Sheets

BOUNDARY AIR/LAMINAR FLOW CONVEYING SYSTEM

BACKGROUND OF THE INVENTION

1. The Field of the Invention

The present invention relates generally to materials handling and/or classifying equipment, and more particularly to a particulate conveying system utilizing an auger combined with double air injection.

2. The Background Art

Pneumatic conveying systems having auger conveyor sections are known in the art and have been in use for many years for transporting various particulate materials, such as pulverized coal, portland cement, grain, pulverized ore, etc., through pipelines and other conduits. Such systems typically comprise a motor driven auger conveyor rotatably mounted within a barrel, a gravity-fed hopper for supplying particulate material to the auger conveyor through an opening in the barrel, and a mixing chamber situated at the discharge end of the barrel where the material ejected by the auger conveyor is subject to one or more jets of pressurized air or other gas.

The mixture of material and gas thus formed is propelled by the pressurized gas through a conduit connected to the mixing chamber. Conventional pneumatic conveying systems with auger conveyor sections have the drawback that the mixing of the pressurized gas with the particulate material in the mixing chamber produces considerable turbulence in the mixture transported through the conduit. Such turbulence is undesirable in that it increases the frequency of contact of the particulate material with the conduit walls during transport and therefore aggravates frictional and wear losses in the conveying system. Frictional losses require higher rates of energy to transport the material and significantly reduce the distance over which the material can be conveyed. When the material being transported is abrasive or corrosive, contact of such material with the conduit walls increases wearing of the walls and reduces the useful life of the conduit.

Pneumatic conveying systems for particulate materials have also been devised in which the mixing of material with gas takes place in a venturi pipe through which pressurized gas flows. By introducing the particulate material into the relatively high velocity gas flow in the constriction or throat of the venturi pipe, mixing of the material with the gas occurs with little turbulence, and therefore the resulting mixture may be propelled through the conduit with reduced frictional loss and less wear of the conduit walls.

In conventional venturi conveying systems, the particulate material to be mixed with the gas is supplied to the venturi pipe via a chute having a discharge end located near the constriction of the venturi pipe, where a vacuum (negative pressure) created by the high velocity gas flow therein acts to draw the material from the chute into the venturi pipe. Because the material being transported does not always flow freely in the chute, the transport rate in a conventional venturi conveying system is difficult to control and is subject to variation caused by changes in the properties of the material being conveyed, such as density, moisture content, particle size, etc. Moreover, a conventional venturi conveying system may not provide a satisfactory material-to-air conveyance ratio for materials that are not sufficiently free flowing in the chute to allow the negative pressure in the venturi pipe to draw such materials from the chute at an adequate rate.

One attempt to improve the conventional venturi conveying systems is described in U.S. Pat. No. 4,711,607 (issued on Dec. 8, 1987 to Wynosky et al.). Because the transport rate through the auger portion of the system is difficult to control, the patent teaches the use of special high pressure jet nozzles in addition to the venturi piping to prevent blow back and product plugs from occurring. The patent also teaches sensors for determining the air pressure difference between an air plenum chamber surrounding the auger barrel and the conduit at the end of the venturi restriction, so as to regulate the product flow through the auger and into the venturi mixing chamber by means of a variable speed motor driving the auger. The system taught in the Wynosky patent does not solve the problems of conveying the material at an adequate rate, and suffers from sever mechanical difficulties related to product blockage and blow back and an inadequate and inconsistent flow rate.

Thus both the conventional auger conveyor systems, the conventional venturi conveying systems, and the venturi systems having adjustable venturi parts and air jet nozzles are subject to the problem of "blowback", which occurs when there is a blockage in the conduit. The blockage results in excessive pressure in the conduit and produces an undesirable back flow of gas and product in the hopper of the auger conveyor system and in the chute or hopper of the venturi conveying system.

Prior attempts to solve the problem of backflow include the use of a flapper valve or an air lock of the auger barrel or in the chute of the venturi system to prevent back flow of gasses and product when the pressure in the conduit becomes excessively high. Such mechanical devises are subject to binding, clogging and wear from contact with abrasive or corrosive materials and therefore require substantial maintenance.

OBJECTS AND SUMMARY OF THE INVENTION

It is therefore an object of the present invention to provide a system for utilizing gaseous flow to convey particulate material which minimizes turbulence in the material-gas mixture.

It is another object of the invention to provide such a system capable of continuously transporting the material at a constant rate under satisfactory air-to-material ratios for a wide range of materials.

It is an additional object of the invention to provide such a system which provides a laminar boundary layer to reduce friction loss and wear on the conduit.

It is still another object of the invention to provide such a system which inhibits backflow.

It is yet another object of the invention to provide such a system which utilizes injections of concentric annular waves of pressurized gas to assist in propelling particulate materials.

The above objects and others not specifically recited are realized in a specific illustrative embodiment of a system for conveying particulate material from a first location to a second location. The system includes an auger rotatably disposed in a cylindrical auger chamber having a discharge end coupled to an inwardly-tapering nose cone. The nose cone is attachable to an elongate conveying conduit for conveying the particulate material. First and second plenum chambers co-act to inject concentric annular waves of pressurized fluid into the nose cone at an entry point adjacent to the discharge end of the nose cone. The arrangement provides a substantially laminar gas layer which lines the interior surface of the conveying conduit and circumscribes a flowing stream of gas and particulate material to thereby minimize contact of the particulate material with the interior surface of the conveying conduit.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

Figures 1, 2:
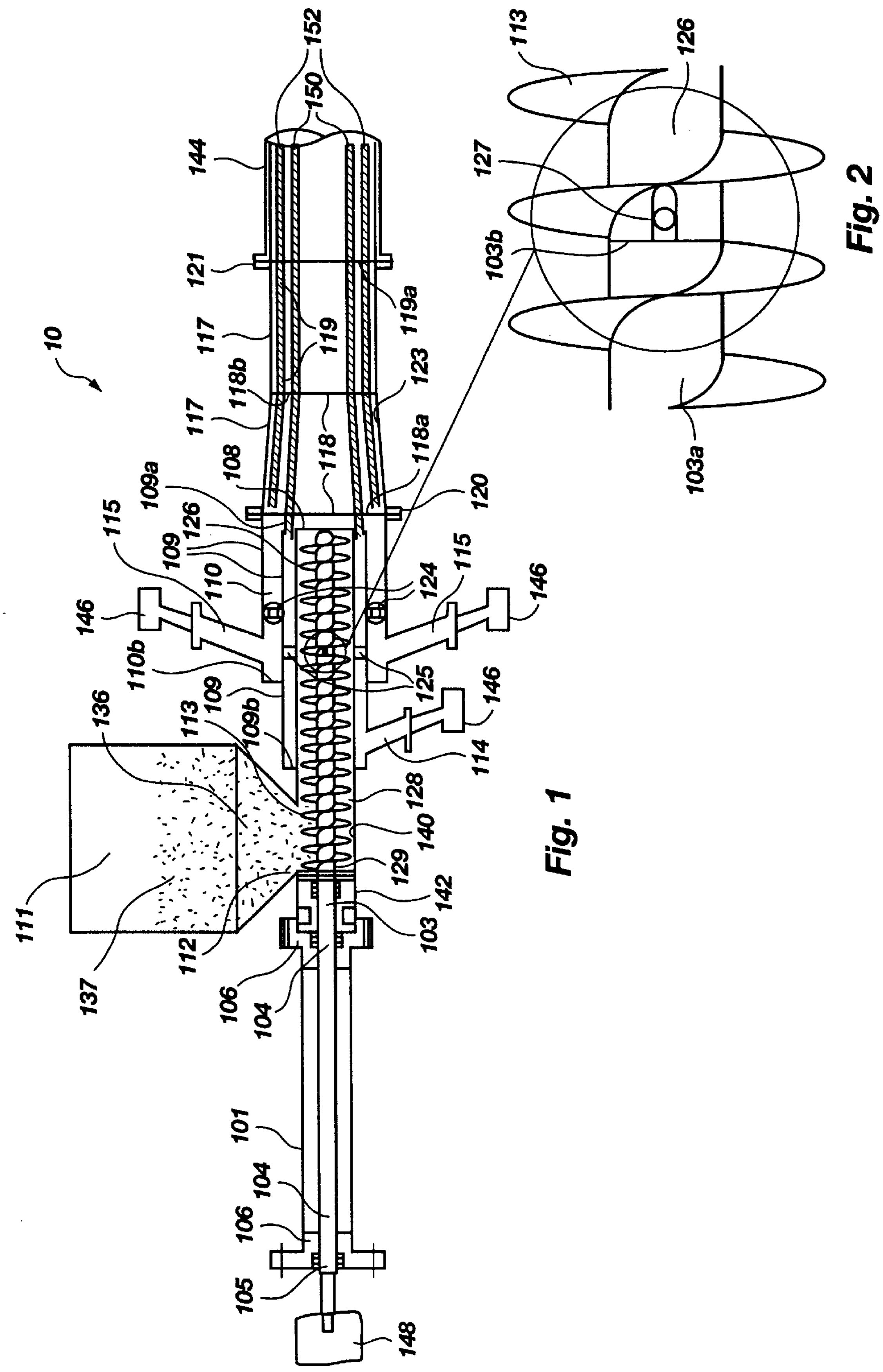
FIG. 1 is a side, cross-section view of a particulate material conveying system made in accordance with the principles of the present invention.
FIG. 2 is a side view of attachment apparatus used to couple an auger adapter to an auger of the system of FIG. 1.

A preferred embodiment in accordance with the present invention is illustrated in FIG. 1 wherein is shown a particulate material conveying system, generally designated at 10. The system 10 includes a cantilevered auger 103 rotatably disposed within an elongate cylindrical barrel 101. The barrel 101 includes cylindrical side walls 140, a first end 142, and an opposing particulate discharge end 108. The side walls 140 include an opening 136 formed therein adjacent to the first end 142 for receiving particulate materials from a funnel-shaped hopper 111. The auger 103 includes a shaft 104 attached to a motor 148 which rotates the auger 103, causing the auger to convey the particulate materials along the barrel 101 and out the particulate discharge end 108. A sealing means 129 is disposed at the first end 142 of the barrel 101 for preventing movement of particulate material through the first end of the barrel.

A nose cone member 117 includes a tapered portion 118 having a first end 118*a*, and a straight portion 119 having an opposing second end 119*a*. Any suitable mixing chamber may be used as the nose cone 117. The tapered portion 118 tapers radially inwardly from the first end 118*a* to a narrower portion 118*b*. The second end 119*a* is configured for attachment to a conveying conduit 144 with flanges 121. An inner plenum chamber 109 is mounted so as to concentrically surround the barrel 101, and an outer plenum chamber 110 concentrically surrounds the inner plenum chamber. The first end 118*a* of the nose cone 117 and the outer plenum chamber 110 are coupled together with flanges 120. The inner plenum chamber includes at least a first injection tube 114 disposed in communication therewith, and the outer plenum chamber 109 includes at least second and third injection tubes 115 disposed in communication therewith, for attachment to blower means 146.

The various blower means 146 operate as known in the art to inject pressurized fluid, such as gas, into the plenum chambers, whereby the inner and outer plenum chambers 109 and 110 cooperatively discharge first and second concentric annular waves of pressurized fluid into the nose cone 117. More specifically, the inner plenum chamber 109 includes a fluid discharge end 109*a* which is concentrically surrounded by the outer plenum chamber 110. The inner plenum chamber 109 discharges a first annular wave 150 of pressurized fluid (shown in side cross-section in FIG. 1) into contact with a second annular wave 152 of pressurized fluid which is discharged by the outer plenum chamber 110 to thereby cause said second annular wave 152 to contactably circumscribe the first annular wave 150. The inner plenum chamber 109 is optional.

The effect of the first annular wave 150 is to lift the material 137 after it is discharged out the end 109*a* of the barrel 101, and to constitute a continuous laminar boundary layer of gas which lines the conduit 144. In the absence of the waves 150 and 152, the material 137 would tend to fall under the influence of gravity immediately after discharge from the barrel 101, but the first annular wave 150 tends to lift and encapsulate the material to enhance transport thereof through the nose cone 117. The effect of the second annular wave is to create a substantially continuous boundary layer of gas against the interior surface of the conveying conduit 144 which tends to repel the particulate material 137 from contacting the walls of the conveying conduit.

Figure 5:
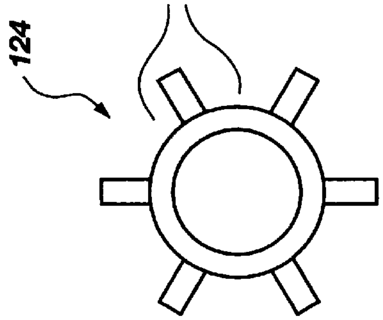
FIG. 5 is front view of a second baffle for use in the system of FIG. 1.
Figure 4:
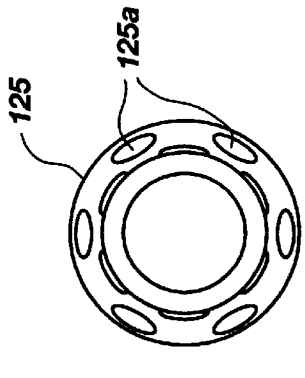
FIG. 4 is front view of a first baffle for use in the system of FIG. 1.
Figure 6:
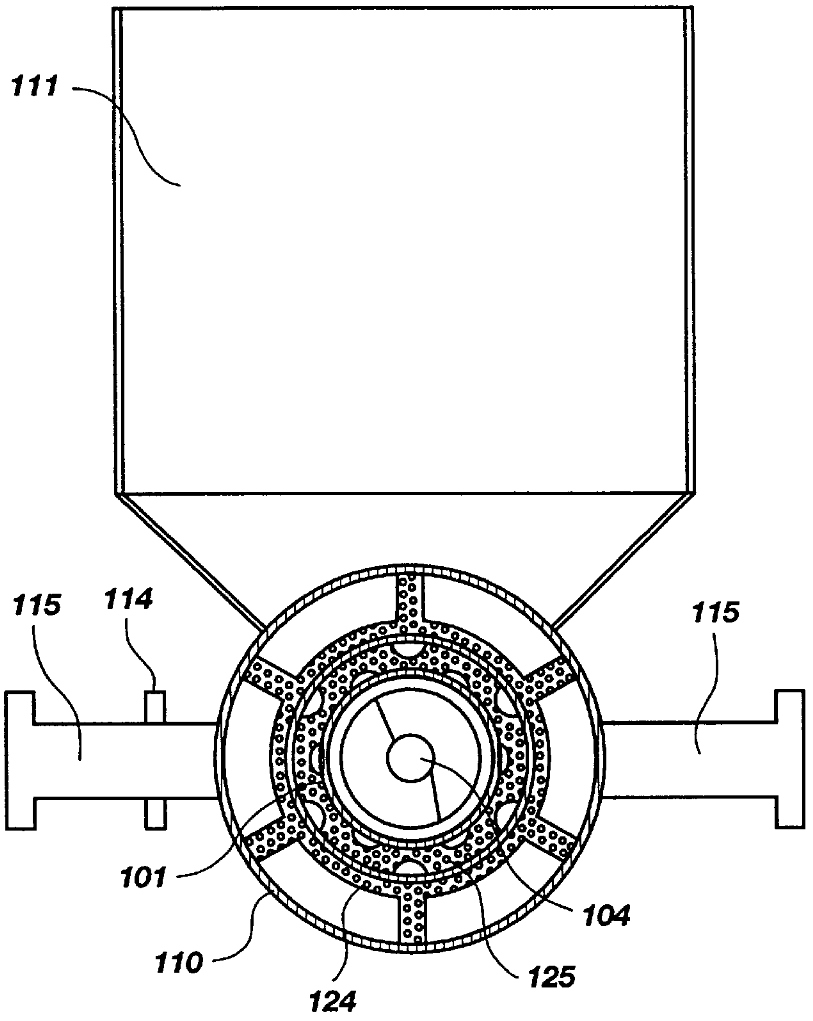
FIG. 6 is an end view of the system of FIG. 1.

The inner and outer plenum chambers include annular interior side walls, and preferably include first and second annular baffle means 125 and 124, respectively, disposed about the interior side walls of the plenum chambers. The first and second annular baffle means 125 and 124 each include at least one gap 125*a* and 124*a* (FIGS. 4 and 5), respectively, for controlling fluid flow through the inner and outer plenum chambers 109 and 110.

The particulate discharge end 108 of the barrel 101 is concentrically surrounded by the first plenum chamber 109. The particulate discharge end 108 is thereby enabled to discharge the particulate material 137 into contact with the first annular wave 150 of pressurized fluid so that the material 137 is contactably circumscribed thereby. The fluid discharge end 109*a* of the inner plenum chamber 109 and the particulate discharge end 108 of the barrel 101 are preferably common to a single plane residing immediately adjacent to the first end 118*a* of the nose cone 117. This permits the first and second annular waves 150 and 152 of pressurized fluid to co-act with particulate discharge action of the auger 103 to cause the particulate material 137 conveyed into the nose cone 117 to be transported through the conveying conduit 144 to a second location.

It is noted that relevant pump sizes are determined by the outside diameter of the auger 103, and vary between 1 inch and 24 inches. The auger 103 may include a main auger portion 103*a* (FIG. 2) with an auger adapter 126 replaceably coupled to its distal end 103*b*. The main auger portion 103*a* includes helical flights 113 having a preferably variable frequency of flights per lineal foot, although a uniform series of flights is also useful. The auger adapter 126 is replaceable with (i) a first substitute auger adapter having a lesser frequency of flights per lineal foot as the main auger portion, and (ii) a second substitute auger adapter having a greater frequency of flights per lineal foot as the main auger portion.

The auger 103 including the auger adapter 126 can be sized and configured in accordance with the inside diameter of the barrel 101 so as to leave an annular passage or clearance 128 between the auger and the inner surface of the barrel. The annular clearance 128 and the axial distance between the auger flights 113 are preferably variable in size depending on the size of the particulate material to be conveyed. Wear on the auger 103 and the side walls 140 of the barrel 101 is reduced as a result of the annular clearance between the auger/auger adapter 103/126 and the barrel 101. The particulate material being conveyed becomes packed between the auger 103 and the side walls 140 of the barrel 101, thereby isolating the side walls 140. Thus, a portion of the particulate material being conveyed acts as the boundary plate over which the rest of the particulate material moves. Further, the packing of the material in the annular space 128 creates a product seal that prevents blowback of the material. This product seal is continuously being created as the product moves through the system 10.

The shaft 104 of the auger 103 preferably projects through a cylindrical bearing 105 supported by suitable bushings 106 and extends to a variable point out the rear end of the barrel 101 for attachment to the motor 148. The bearing 105 and the bushings 106 enhance the rotating action of the auger 103 and constitute the main support for the auger. The shaft 104 thus extends through the sealing means 129, which is preferably a suitable mechanical seal for preventing the particulate material 137 from flowing backward beyond point 112, and to insure that the material falls directly from the hopper 111 into contact with the auger flights 113.

The particulate material 137 to be transported by the conveying system 10 is thus supplied by the vertically disposed, funnel-shaped hopper 111. Particulate material 137 contained in the hopper 111 drops onto the auger 103 through the opening 136 formed in the barrel 101. The auger 103 is driven to rotate in a direction which causes the flights 113 of the auger to push the particulate material toward the particulate discharge end 108 of the barrel 101. The material is thereby ejected from the particulate discharge end 108 at a rate and velocity determined by the rotational speed of the auger 103 and auger adapter 126 and the pitch of the flights 113. The rotational speed of the auger 103 has been found to be advantageous in the range of 1800 to 3600 r.p.m. In general, the characteristics of the flights 113 as well as the auger adapter 126, the degree of taper in the nose cone 117, and the baffle means 125 and 124 can be replaceably adjusted to the performance of the system 10 to optimize performance.

FIG. 2 illustrates attachment apparatus 127 for replaceably attaching an auger adapter 126 to the main auger 103. It will be appreciated that variation of the spacing and pitch of the flights 113 of the auger adapter 126 can improve performance of the system 10. This is preferably accomplished by selectively replacing the auger adapter 126 depending on the physical characteristics of the particulate material being conveyed.

Referring now to FIGS. 3A–D, it is noted that many different embodiments of the auger adapter are in accordance with the principles of the present invention, including the adapters shown at 126*a–d*. Each auger adapter includes a central shaft 141 having a proximal portion 141*a* and a distal portion 141*b*. The auger adapter can be designed as either single lead or multiple lead, depending on material characteristics such as whether the material to be pumped is wet or dry, and function in a manner to prevent air interference (blow back) with the product flow. The distance between flights of the auger adapter 126 is an important variable which can be used to enhance or make a product seal. The cutting angle of the free end of the flights on the auger adapter 126 (described below in more detail and in reference to FIG. 3E) is critical with respect to holding and flailing the material in a desired manner to create a desired product seal effect, and for directing and dispersing the material into the air flow within the nose cone 117.

Figure 3E:
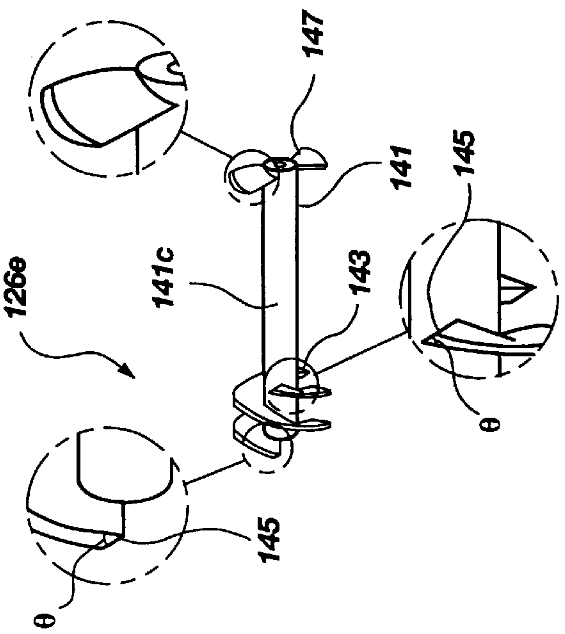
FIGS. 3A–E are side views of auger adapters for use in the system of FIG. 1.
Figure 3C:
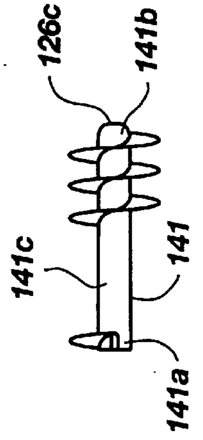
Figure 3D:
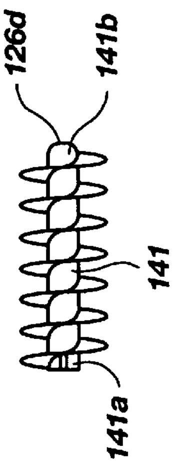
Figure 3A:
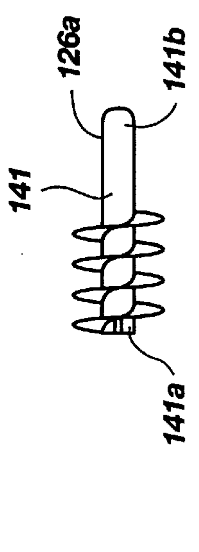
Figure 3B:
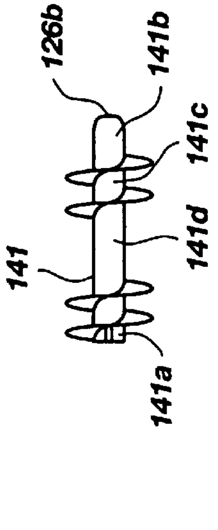

FIG. 3A shows an auger adapter 126*a* having a single section of flights disposed around the proximal portion 141*a* of the shaft 141 such that the remainder of the shaft is characterized by an absence of flights thereon. FIG. 3B shows an auger adapter 126*b* having a first section of flights disposed around the proximal portion 141*a* of the shaft 141 and a second section of flights disposed around a first intermediate portion 141*c* of the shaft such that the distal portion 141*b* of the shaft and a second intermediate portion 141*d* of the shaft residing between the first and second sections of flights are both characterized by an absence of flights thereon. FIG. 3C shows an auger adapter 126*c* having a first section of flights disposed around the distal portion 141*b* of the shaft such that an intermediate portion 141*c* of the shaft is characterized by an absence of flights thereon. FIG. 3D shows an auger adapter 126*d* having a single section of flights extending along substantially the entire length of the shaft 141.

The purpose of most of the auger adapters is to establish a product seal at some specific location within the barrel 101, depending upon the characteristics of the particulate material 137 (FIG. 1) such as size, weight, density, texture, moisture content and the like. The portions of the shaft 141 of the auger adapters 126*a–c* which are characterized by an absence of auger flights thereon operate to impede somewhat the flow of material because there are no flights to push the material forward. When the particulate material 137 reaches such points it tends to slow and fill up that portion of the barrel 101 and becomes a densely packed ripple (not shown) in the flowing material. The densely packed ripple constitutes a product seal which operates to create resistance to any blow back of the material, so that the direction of least resistance is in the direction of the nose cone 117 and the conduit 144. It can thus be understood that the auger adapter 126*b* shown in FIG. 3B operates to create two product seals, since both the distal portion 141*b* and the second intermediate portion 141*d* are characterized by an absence of flights thereon. Stated another way, the various adaptations of the auger adapter are designed to prevent blow back by enhancing the packing of particulate material, depending upon the physical characteristics of the material, to control the mixing and dispersion of the particulate material with the air stream in the nose cone 117.

Regardless of the specific configuration of a particular auger adapter, it is preferred that there be flights disposed at the proximal end of the adapter which terminate in at least one free end configured for connectingly abutting against the flights 113 (FIG. 1) of the main auger 103. The surface of the free edge preferably matches the free end of the main auger flights to effect a continuation of the main auger flights. The purpose is to preserve the life of the main auger by minimizing wear thereof. Applicant has found that the free end of auger flights undergoes substantial wear, much more so than the rest of the flights. By extending the distal end of the main auger flights with continuing flights disposed on the proximal portion 141*a* of the auger adapter 126, it is the continuing proximal flights of the adapter which will bear the increased wear and not the distal end of the flights 113 of the main auger 103. This advantage can be accomplished with even some minimal flight portion, such as only half a flight as shown disposed on the proximal portion 141*a* of the auger adapter 126*c* of FIG. 3C. The sections of the flights of any auger adapter 126 can be configured to vary in pitch and frequency.

The flights of the auger adapters have opposing sides and terminate in free ends 143 having an end face 145, as shown in FIG. 3E. The opposing sides of the flights at each free end 143 define substantially parallel opposing planes. Preferably, each end face 145 is configured to form an acute angle θ which each of the opposing planes defined by the opposing sides of the flights at the corresponding free end 143. The angled end face 145 as just described in conjunction with FIG. 3E can be formed at the free ends of the flights of any of the auger adapters 126*a–d*. Therefore, in the case of the auger adapters 126*b–c* of FIGS. 3B–C, the flights can include opposing free ends separated by an intermediate portion (141*c* in FIG. 3C; 141*d* in FIG. 3D) of the shaft 141, wherein the opposing free ends terminate in end faces such as embodied at 145 in FIG. 3E. The angled nature of the end face as at 145 forms a cutting edge which operates to urge or flail the particulate material 137 in a direction consistent with the orientation of the end face. For example, the end faces 145 can be oriented so as to face at least partially toward the particulate discharge end 108 of the barrel 101, or to face at least partially in a direction away from the particulate discharge end. The end face 145 of a particular free end of an auger adapter f light may defines a concave surface if desired, in order to further influence the flailing action of the particulate material 137.

The auger adapter may also include a beater blade 147 (shown in FIG. 3E) disposed upon the distal end of the shaft 141 so as to be confined to rotation with the shaft. The beater blade 147 serves to slice and directionalize the particulate material 137 just prior to entry into the nose cone 117. The beater blade 147 may includes dual opposing blades as shown in FIG. 3E, or any other suitable blade configuration.

The inner and outer plenum chambers 109 and 110 preferably have a variable inside diameter depending on the nature of the material to be pumped, such as by selective replacement. The outside plenum chamber 110 is preferably about double the size of the inner plenum chamber 109. The outside plenum chamber 110 preferably includes the second and third injection tubes 115 connected to a blower means 146, whereas the inner plenum chamber 109 preferably has only a first injection tube 114 connected to a blower means 146, for introducing pressurized air into the plenum chambers. The blower means 146 is preferably of a conventional type (i.e. such as a Roots Blower™) which provides airflow at a volume rate based on the variables inherently controlled by the restricting baffles 124 and 125 of the plenum chambers 109 and 110. The size of the plenum chambers 109 and 110 cooperate to provide appropriate channeling of the direction of air flow suited to the particulate material being conveyed and the length of conveying conduit 144.

It is to be understood that the nose cone 117 is not a venturi pipe. Although the nose cone 117 includes the tapered portion 118, there is no constricted throat section followed by a diffuser or outwardly-tapering conical surface, as in conventional venturi pipe systems, to create a venturi effect. The tapered section 118 includes a frustoconical interior surface 123, which is preferably coaxial with the barrel 101. It is to be understood that the taper of the nose cone 117 also controls characteristics of product flow at the continuous boundary layer of gas and can be replaceably varied by those having ordinary skill in the art according to product conditions, i.e. wet or dry etc.

The system 10 may of course operate with or without auger adapters. In either case, the flights (either of the main auger 103 or of the auger adapter 126) preferably end substantially inside the barrel so as to allow the auger adapter 126 to extend a short variable distance. The auger adapter 126 may terminate either just inside or just outside the particulate discharge end 108 of the barrel 101.

A volume flow rate from 50 to 10,000 C.F.M. can be achieved depending on whether a one inch or ten inch pump is employed. Nevertheless, gas pressures developed within the plenum chambers 109 and 110 in the range of 0 to 6 psi (pounds per square inch) are universal and are not dependent on pump size. For example, 4 to 6 psig is a suitable pressure range for transporting garnet ore through a conveying conduit 144 of approximately 300 feet utilizing a one inch pump (again, pump sizes are selected on the basis of the outside diameter of the auger). The gas pressures developed within the plenum chambers 109 and 110 are preferably within a range of approximately 2 psi to 12 psi. Blowers are preferred over compressors for use as the blowing means 146 because the system 10 preferably operates at low pressures. The pressure required to maintain preferred volume flow rates ordinarily depends on the variables discussed above and the properties of the material being transported.

The material particles that are introduced into the tapered section 118 of the nose cone 117 are accelerated in such a manner that a stream of gas and material is created which causes the larger and denser particles to converge towards the center of the airstream, thus allowing for particle separation and concentration of such particles. Moreover, mixing of the particulate material with the airstream in the manner described above produces minimal turbulence in the mixture flowing from the nose cone 117 and sets up a laminar boundary layer of air along the side walls 140 of the nose cone 117 and conveying conduit 144. For that reason, when such a mixture is propelled through the conveying conduit 144, contact of the material with the conduit walls is substantially inhibited and is quite minimal.

Pressure differences between the conveying conduit 144 and the plenum chambers 109 and 110 are maintained for any given particulate matter by the degree of taper of the nose cone 117 and by the auger adapter 126. These structural combinations result in lower pressure within the conveying conduit 144 than in the nose cone 117 which provides an effective flow of the particulate material. Little or no backflow occurs in the system 10 when the baffles 125 and 124 and other variables are set to meet the standards of the material being pumped, as can be accomplished by those having ordinary skill in the art. It is not necessary to monitor the pressure differences in order to prevent backflow, nor is any sensor necessary to automatically adjust the blower rate or the speed of the auger 103, or to provide any reduction in the material supply rate.

The above-described system 10 in accordance with the present invention is capable of continuously transporting particulate materials having random particle sizes up to particle dimensions equal to the distance between the auger flights 113, preferably one inch or more. A typical air-to-material conveying ratio is 10% to 25% solids and a corresponding 90% to 75% gases. In addition, the present invention provides highly efficient removal of moisture from the material being conveyed, as the particulate material 137 is accelerated through the nose cone 117 which draws moisture from the surfaces of the particles being accelerated.

It will be appreciated that various modifications and alternative configurations of the exemplary auger adapters 126, degree of taper in the nose cone 117, baffles 125 and 124 and inner and outer plenum chambers 109 and 110 of the system 10 can be made by those manufacturing the system to accommodate different product characteristics. Other changes may from time to time be made by those skilled in the relevant arts without departing from the spirit and scope of the invention as defined by the appended claims. For example, the auger adapter 126 fitted at the distal end of the auger 103 may have shapes other than those illustrated herein. More than one entrance for introducing pressurized air into the plenum chambers 109 and 110 may be made. The plenum chambers 109 and 110 may be varied in size and the baffles 125 and 124 within the plenum chambers may be configured with alternative sized openings and shapes in order to direct the air flow better and reduce turbulence. The auger adapter 126 is preferably, but not necessarily, positioned so as to reside completely inside the discharge end 108 of the barrel 101. Gases other than air may be used for transporting the particulate material. Of course, the diameter and other dimensions of the barrel 101, the discharge locus of the plenum chambers, etc., may be varied as needed to suit the nature of the material to be conveyed through the conduit.

Figure 7A:
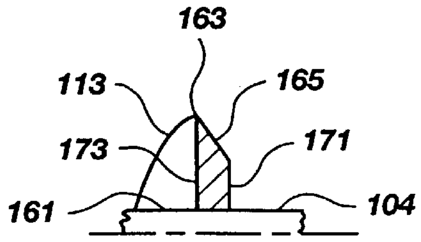
FIGS. 7A–D are various cross sectional views of alternative embodiments of an auger flight used in the system of FIG. 1.
Figure 7C:
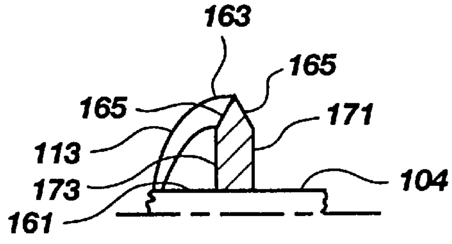
Figure 7B:
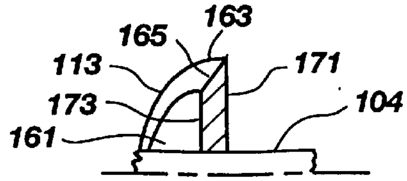

FIGS. 7A–C illustrate cross sectional views of alternative embodiments of the auger flights 113. The flights 113 include a lowest portion 161 disposed on the shaft 104 and extending outwardly therefrom to terminate in a free outer edge 163. The flights 113 of the auger 103 and/or of the auger adapter 126 may include an angled or tapered contacting face 165 on one or both sides as shown. This results in the flights 113 having a tapered cross section defined by the opposing sides 171 and 173 of the flights 113, wherein at least one of the sides tapers from a wider lower portion of the flight backwardly toward the opposing side and outwardly to the free edge 163 to define the tapered contacting face 165 such that the free edge 163 is narrower than the wider lower portion to thereby enhance deflection and transport of the particulate material 137 by the flights 113. Preferably, the free edge 163 is not only narrower than the lower portions of the flight, but actually terminated in a sharp edge as shown in the FIGS. 7A–C.

A single tapered contacting face 165 can be configured on either side 171 or 173 of the flights 113, as shown in FIGS. 7A and 7B, respectively. Alternatively, dual tapered contacting faces 165 can be formed from both sides 171 and 173 as shown in FIG. 7C. The tapered contacting faces 165 can thus be oriented to face toward the nose cone 117 as in FIG. 7A, to thereby cause any particulate material which happens to fall onto the contacting faces to be deflected toward the nose cone 117. It is to be understood that the term "tapered" as used herein shall not be limited to planer surfaces but shall refer broadly to any surface which tends to provide a wedge shape to an element. For example, it can be seen from FIGS. 7A–C one or both of sides 171 and 173 tend to provide a wedge shape to the flights 113. The tapered contacting face 165 may even be of convex or concave surface geometry and if so, could still be defined as tapered.

Figure 7D:
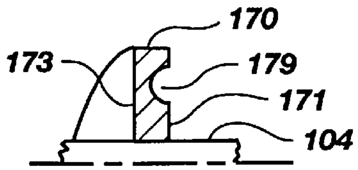

As shown in FIG. 7D, the flight 113 may also remain essentially rectangular in cross section. In addition, the flight 113 may include a concavity 179 formed in one or both of the sides 171 and 173, to create a desired movement of the particulate material 137.

The respective gaps 124*a* and 125*a* of the baffle means 124 and 125 are preferably formed uniformly about their respective baffles. The first baffle means 125 is preferably replaceable with (i) a first substitute baffle means having a lesser amount of gap space formed therein than the first baffle means, and (ii) a second substitute baffle means having a greater amount of gap space formed therein than the first baffle means. The second baffle means 124 is preferably replaceable with (i) a third substitute baffle means for creating a lesser resistance to fluid flow than the second baffle means, such as a substitute baffle means having greater overall gap space than the second baffle means and (ii) a fourth substitute baffle means for creating a greater resistance to fluid flow than the second baffle means, such as a substitute baffle means having less overall gap space than the second baffle means.

Figure 9A:
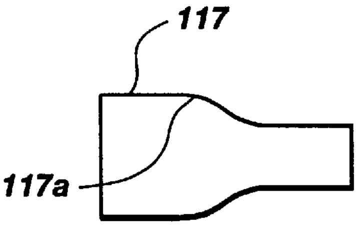
FIGS. 9A–B are alternative embodiments of a nose cone used in the system of FIG. 1.
Figure 9B:
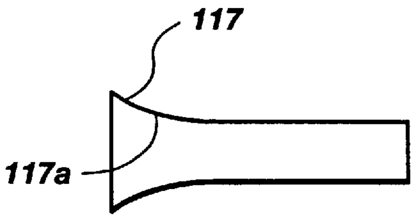

It is to be understood that the nose cone 117 is preferably replaceably coupled at its first end 118*a* to the outer plenum chamber 110, and the second end 119*a* of the nose cone is preferably configured to be removeably coupled to the conveying conduit 144. The nose cone 117 is preferably replaceable with (i) a first substitute nose cone having a greater degree of taper than the original nose cone, and (ii) a second substitute nose cone having a lesser degree of taper than the original nose cone. Referring to FIGS. 9A–B, the interior surface 117*a* of the nose cone 117 can be concave (FIG. 9A) or convex (FIG. 9B). It will thus be appreciated that the phrase "tapered nose cone" shall refer broadly to any nose cone surface which has a trend of general radial variation along its axial direction. Put another way, the term "taper" shall not be limited herein to planer surfaces.

The inner plenum chamber 109 includes a first rear-end plate 109*b*, and the outer plenum chamber 110 includes a second rear-end plate 110*b*. The first injection tube 114 is preferably angled with respect to a central axis of the inner plenum chamber 109 to thereby inject a first stream of pressurized fluid into the inner plenum chamber and toward the first rear-end plate 109*b*. The second and third injection tubes 115 are preferably angled with respect to a central axis of the outer plenum chamber 110 to thereby inject pressurized fluid into the outer plenum chamber and toward the second rear-end plate 110*b*. This causes the fluid streams to hit the back plates 109*b* and 110*b* of the plenum chambers to reduce turbulence and help create the laminar effect in the nose cone 117 and conveying conduit 144 to reduce friction and wear. For example, center lines of the injection tubes 114 and 115 might be advantageously oriented at an angle of about five degrees relative to a plane which is perpendicular to centerlines of the corresponding plenum chambers.

An additional option provided by the invention is that the particulate discharge end 108 of the barrel 101 and the outer plenum chamber 110 can be designed to be axially slidable relative to each other, in any suitable manner known to those skilled in the relevant art. Applicant has discovered that such axial adjustment enables a user to enhance movement of the particulate material 137.

Figure 8A:
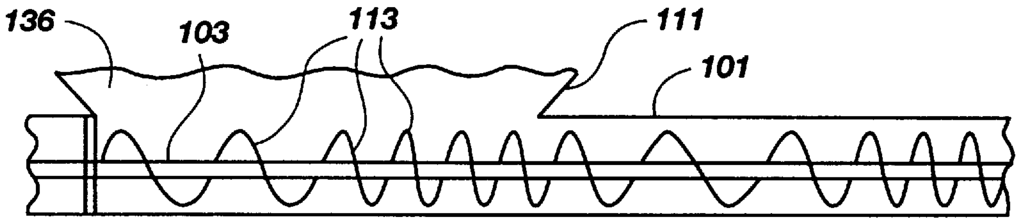
FIGS. 8A–C are various partial views of the system of FIG. 1 showing alternative embodiments of an auger flight used in the system of FIG. 1.
Figure 8B:
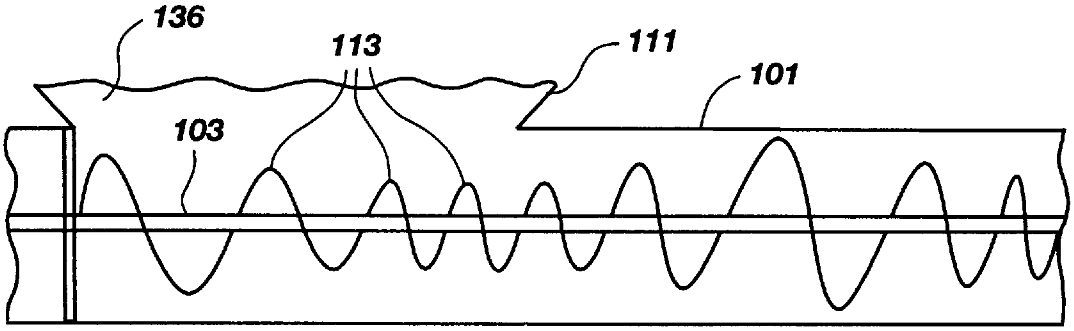

Applicant has also found that rotation of the auger 104 creates an air velocity which tends to repel the particulate material and thereby impede progress of the material toward the nose cone 117. Applicant has solved this problem by providing helical auger flights 113 varying in pitch and frequency as in FIGS. 8A–C to thereby produce a pulsing movement of the particulate material within the barrel 101 toward the nose cone 117. Applicant has found that such variation in the flights 113 operates to convey the material 137 in a pulsing movement which counteracts the repelling action of the repelling air velocity. The flights could also be varied in height, as shown in FIG. 8B.

Figure 8C:
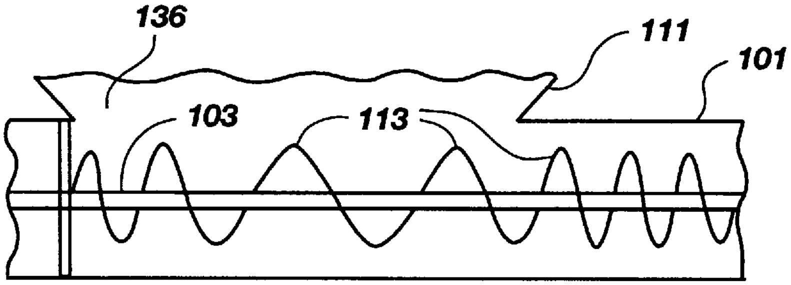

There are of course many combinations of such variations. FIG. 8A shows flights 113 which alternate between varied and uniform pitch and frequency, beginning at the opening 136 with the variations. FIG. 8B shows flights 113 which alternate between varied pitch, frequency and height and uniform pitch, frequency and height, beginning at the opening 136 with the variations. FIG. 8C shows flights 113 which alternate between uniform and varied pitch and frequency, beginning at the opening 136 with a uniform section of flights.

The flights 113 can be limited to just one varied section, but may also continually alternate between uniform and varied sections. Referring to FIGS. 8A–C, applicant has found that, for some applications, an effective pulsing movement is achievable by varying the auger flights 113 in pitch and frequency (and perhaps height as in FIG. 8B) across approximately an initial fifty percent of the opening 136 in the barrel 101, followed by a section of flights which are substantially uniform in pitch and frequency (and height as in FIG. 8B). In particular, the variable flight aspect preferably involves auger flights 113 as in FIGS. 8A–C having at least a first section of flights residing between second and third sections of flights which vary in pitch and frequency with said first section of flights to thereby produce a pulsing movement of the particulate material within the barrel 101.

The motor 148 may be a variable speed motor operably attached to the auger 104 for rotating the auger to thereby enable a user to adjust the rotational velocity of the auger so as to enhance transport of the particulate material 137 by the auger.

The operation of the system 10 and the effective transport of the particulate material 137 can thus be enhanced by adjusting, replacing and/or selecting a number of variable structures, including, but not limited to, the following: the pitch, frequency and/or height of the flights 113; the degree of taper of at least one side 139 of the flights 113; the cross-sectional shape of the flights 113 (concave, planer or convex side surface); the speed of the motor 148; the auger adapter 126; the position of the particulate discharge end 109*a* of the barrel 101 relative to the outer plenum chamber 110/first end 118*a* of the nose cone 117; the amount of gap space formed in one or both baffles 124 and 125; the degree of taper of the nose cone 117; the shape of the interior surface 117*a* of the nose cone 117 (concave, planer or convex); the length of the nose cone 117. Applicant has discovered that a skilled user can vary, replace and/or select one or more of these configurations in order to optimize performance of the system 10, depending upon the size, weight and/or moisture content of the particulate material 137 to be conveyed. There is no clear test as to which combination of variable structures is best for a material having a given size, weight and moisture content—the best combination can be discovered empirically through trial and error.

Those skilled in the art will appreciate that the scope of the present invention encompasses many combinations and a broad spectrum of features and structures equivalent to those specifically discussed herein. The principles of the invention may thus be used in any setting requiring the advantages thereof. Those having ordinary skill in the field of this invention will appreciate the advantages of the invention and its application to a wide variety of uses, and that objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, the portion of the barrel 101 which is co-extensive with the inner plenum chamber 109 is not required, but is preferred in order to be properly channeled into initial contact with the particulate material at some point beyond the particulate discharge end 108. Accordingly, the inner plenum chamber 109 (or any suitable injection means) may "concentrically surround" the auger 103 (or any suitably moving/conveying means) as that phase is used herein with or without that portion of the barrel 101 which is co-extensive with the inner plenum chamber.

The phrase "disposed in communication" as used herein shall not be limited to an interpretation that a first element is directly connected to a second element. For example, the auger 103 and its barrel 101 can be defined as being disposed in communication with the nose cone 117 (or any suitable mixing chamber) even though not physically connected therewith and even though a gap exists between the terminal discharge end 108 of the barrel 101 and the first end 118*a* of the nose cone 117. Since open air space exists between the auger/barrel 103/101 element and the nose cone 117, they are "disposed in communication," and similarly broad interpretation of that phrase shall be applied wherever it is used herein.

The phrase "contactably circumscribe" as used herein shall be construed broadly to refer to a first element which surrounds a second element, even in an absence of any definite physical boundary therebetween. For example, a first annular wave of pressurized fluid ejected from the inner plenum chamber 109 can be defined as contactably circumscribing particulate material ejected from the discharge end 108 of the barrel 101, even where part of the wave of fluid effectively mixes with the particulate material to create a core stream of fluid and material.

What is claimed is:

1. A system for conveying particulate material from a first location to a second location, the system comprising:

a mixing chamber having a first opening and an opposing second opening;

moving means disposed in communication with the mixing chamber for receiving particulate material at a first location and moving said particulate material away from said first location and into the mixing chamber;

first injection means concentrically surrounding the moving means and being disposed in communication with the first opening of the mixing chamber for injecting a first annular wave of pressurized fluid therein;

second injection means concentrically surrounding at least a portion of the first injection means and being disposed in communication with the first opening of the mixing chamber for injecting a second annular wave of pressurized fluid therein, such that the first and second annular waves of pressurized fluid co-act with the moving means to cause the particulate material to be transported through the mixing chamber to a second location.

2. The system as defined in claim 1, wherein the first injection means includes a fluid discharge end concentrically surrounded by the second injection means to thereby cause said first injection means to discharge the first annular wave of pressurized fluid into contact with the second annular wave of pressurized fluid such that said second annular wave of pressurized fluid contactably circumscribes said first annular wave of pressurized fluid.

3. The system as defined in claim 1, wherein the moving means includes an auger rotatably disposed within an elongate, axially-extending housing having a particulate discharge end concentrically surrounded by the first injection means to thereby cause said discharge end to discharge the particulate material into contact with the first annular wave of pressurized fluid such that said first annular wave of pressurized fluid contactably circumscribes the discharged particulate material.

4. The system as defined in claim 3, wherein the particulate discharge end of the housing and the second injection means are axially slidable relative to each other to thereby enable a user to enhance movement of the particulate material by adjusting the relative positioning of said particulate discharge end and the second injection means.

5. The system as defined in claim 2, wherein the moving means includes an auger rotatably disposed within an elongate, axially-extending housing having a particulate discharge end concentrically surrounded by the first injection means to thereby cause said particulate discharge end to discharge the particulate material into contact with the first annular wave of pressurized fluid such that said first annular wave of pressurized fluid contactably circumscribes the discharged particulate material, and wherein the fluid discharge end of the first injection means and the particulate discharge end of the housing are substantially common to a single plane.

6. The system as defined in claim 1, wherein the first and second injection means each have annular interior side walls the system further comprising:

first and second annular baffle means disposed about the annular interior side walls of the first and second injection means, said first and second annular baffle means each including at least one gap formed therein for respectively channeling fluid flow of the first and second annular waves in a linear direction through the first and second injection means, respectively.

7. The system as defined in claim 5, wherein the first baffle means is replaceable with (i) a first substitute baffle means having a lesser amount of gap space formed therein than the first baffle means, and (ii) a second substitute baffle means having a greater amount of gap space formed therein than the first baffle means, and wherein the second baffle means is replaceable with (i) a third substitute baffle means having a lesser amount of gap space formed therein than the second baffle means, and (ii) a fourth substitute baffle means having a greater amount of gap space formed therein than the second baffle means.

8. The system as defined in claim 1, wherein the moving means comprises an elongate cylindrical barrel having a particulate discharge end and rotational auger means rotatably disposed within the barrel for conveying the particulate material through the barrel and out of the particulate discharge end, said auger means comprising a main auger having auger flights and a distal end and an auger adapter replaceably attached at the distal end of main auger so as to be confined to rotation with said main auger.

9. The system as defined in claim 8, wherein the auger adapter is replaceable with a substitute auger adapter having auger flights disposed around a central shaft, said shaft having proximal and distal portions, said substitute auger adapter being selected from the group consisting of the following adapters:

(i) an adapter having a single section of flights disposed around the proximal portion of the shaft such that the remainder of the shaft is characterized by an absence of flights thereon;

(ii) an adapter having a first section of flights disposed around the proximal portion of the shaft and a second section of flights disposed around a first intermediate portion of the shaft such that the distal portion of the shaft and a second intermediate portion of the shaft residing between the first and second sections of flights are both characterized by an absence of flights thereon;

(iii) an adapter having a first section of flights disposed around the distal portion of the shaft such that an intermediate portion of the shaft is characterized by an absence of flights thereon; and (iv) an adapter having a single section of flights extending along substantially the entire length of the shaft.

10. The system as defined in claim 9, wherein the auger adapter is configured for attachment at its proximal portion to the distal end of the main auger and wherein any flights disposed on the proximal portion of the auger adapter terminate in at least one free end configured for connectingly abutting against the flights of the main auger.

11. The system as defined in claim 10, wherein the flights of the auger adapter vary in pitch and frequency.

12. The system as defined in claim 10, wherein the flights of the auger adapter have opposing sides and terminate in at least one free end having an end face, and wherein said opposing sides of the flights at the free end define substantially parallel opposing planes, said end face being configured to form an acute angle with each of said opposing planes.

13. The system as defined in claim 12, wherein auger adapter (iii) includes a second section of flights disposed about the proximal portion of the shaft, and wherein the first and second sections of flights of each of the adapters (ii) and (iii) include opposing free ends separated by an intermediate section of the shaft, said opposing free ends terminating in end faces as described and claimed in claim 12.

14. The system as defined in claim 13, wherein the end face of at least one free end of the flights of the substitute auger adapter is oriented so as to face at least partially toward the particulate discharge end of the barrel.

15. The system as defined in claim 13, wherein the end face of at least one free end of the flights of the substitute auger adapter is oriented so as to face at least partially in a direction away from the particulate discharge end of the barrel.

16. The system as defined in claim 12, wherein the end face of at least one free end of the flights of the substitute auger adapter defines a concave surface.

17. The system as defined in claim 9, wherein the distal portion of the shaft of the substitute auger adapter terminates in a distal end, and wherein the substitute auger adapter further includes a beater blade disposed upon the distal end of the shaft so as to be confined to rotation with said shaft.

18. The system as defined in claim 1 wherein the mixing chamber comprises a nose cone having a wider portion and a narrower portion and an interior surface which tapers radially inwardly from the wider portion to the narrower portion, the narrower portion being configured for attachment to a conveying conduit for conveying the particulate material to the second location.

19. The system as defined in claim 18, wherein the first injection means includes a fluid discharge end concentrically surrounded by the second injection means to thereby cause said first injection means to discharge the first annular wave of pressurized fluid into contact with the second annular wave of pressurized fluid such that said second annular wave of pressurized fluid contactably circumscribes said first annular wave of pressurized fluid;

wherein the moving means includes an auger rotatably disposed within an elongate, axially-extending housing having a particulate discharge end concentrically surrounded by the first injection means to thereby cause said particulate discharge end to discharge the particulate material into contact with the first annular wave of pressurized fluid such that said first annular wave of pressurized fluid contactably circumscribes the discharged particulate material, and wherein the fluid discharge end of the first injection means and the particulate discharge end of the housing are substantially common to a single plane facing the wider portion of the nose cone.

20. The system as defined in claim 18, wherein the nose cone is replaceably coupled at its wider portion to the second injection means and wherein the narrower portion is configured to be removeably coupled to the conveying conduit, said nose cone being replaceable with (i) a first substitute nose cone having a greater degree of taper than the original nose cone, and (ii) a second substitute nose cone having a lesser degree of taper than the original nose cone.

21. The system as defined in claim 20, wherein the interior surface of the nose cone comprises a concave surface.

22. The system as defined in claim 20, wherein the interior surface of the nose cone comprises a convex surface.

23. The system as defined in claim 1, wherein the first injection means comprises a first plenum chamber having a first rear-end plate and at least a first fluid-injecting means disposed in communication with the first plenum chamber for injecting a first stream of pressurized fluid into said first plenum chamber and toward the first rear-end plate.

24. The system as defined in claim 23, wherein the second injection means comprises a second plenum chamber having a second rear-end plate and at least a second fluid-injecting means disposed in communication with the second plenum chamber for injecting pressurized fluid into said second plenum chamber and toward the second rear-end plate.

25. The system as defined in claim 24, where the at least second fluid-injecting means comprises second and third fluid injecting means for respectively injecting second and third streams of pressurized fluid into the second plenum chamber and toward the second rear-end plate.

26. The system as defined in claim 1, wherein the moving means comprises:

an elongate cylindrical barrel having cylindrical side walls and a first end and an opposing particulate discharge end, said side walls having an opening formed therein adjacent to the first end for receiving particulate materials into the barrel;

particulate sealing means disposed at the first end of the barrel for preventing movement of particulate material through the first end of the barrel; and rotational auger means rotatably disposed within the elongate cylindrical barrel and extending into the barrel for conveying the particulate material through the barrel and out of the particulate discharge end thereof.

27. The system as defined in claim 1, wherein the moving means includes a rotational auger means having auger flights disposed around a central shaft, said flights including a lowest portion disposed on the shaft and extending outwardly from the shaft to terminate in a free outer edge, said flights further including a tapered cross section defined by opposing sides wherein at least one of said sides tapers from a wider lower portion of the flight backwardly toward the opposing side and outwardly to a free edge of the flight to define a tapered contacting face such that said free edge is narrower than the wider lower portion to thereby enhance deflection and transport of the particulate material by the flights.

28. The system as defined in claim 27, wherein the at least one tapered side of the auger flights comprises a concave surface.

29. The system as defined in claim 27, wherein the at least one tapered side of the auger flights comprises a convex surface.

30. The system as defined in claim 27, wherein all of the tapered contacting faces of the flights are facing toward the mixing chamber to thereby cause any particulate material which happens to fall onto the contacting faces to be deflected toward said mixing chamber.

31. The system as defined in claim 1, wherein the first and second injection means each comprise means for injecting a pressurized gas into the mixing chamber under a pressure within a range of approximately 2 psi to 12 psi.

32. The system as defined in claim 1, wherein the moving means comprises auger means rotatably disposed within an elongate cylindrical barrel, said auger means including helical auger flights having at least a first section of flights residing between second and third sections of flights which vary in pitch and frequency with said first section of flights to thereby produce a pulsing movement of the particulate material within the barrel.

33. The system as defined in claim 32, wherein the barrel has a receiving portion and an opposing discharge portion and further includes an opening formed therein at the receiving portion and above the auger for receiving particulate material into the barrel and onto the auger, and wherein the helical auger flights vary in pitch and frequency across approximately an initial fifty percent of the opening in the barrel followed by a section of flights which are substantially uniform in pitch and frequency.

34. A system for conveying particulate material from a first location to a second location, the system comprising:

a mixing chamber having a first opening and an opposing second opening;

a barrel having side walls and a first end and an opposing particulate discharge end, said particulate discharge end being disposed in communication with the first opening of the mixing chamber, said barrel having an opening formed in the side walls thereof adjacent the first end for receiving particulate materials thereinto;

rotational auger means rotatably disposed within the barrel for conveying the particulate material through the barrel and out of the particulate discharge end and into the mixing chamber;

first plenum means concentrically surrounding the barrel and being disposed in communication with the mixing chamber for injecting a first annular wave of pressurized fluid into said mixing chamber;

second plenum means concentrically surrounding the first plenum means and being disposed in communication with the mixing chamber for injecting a second annular wave of pressurized fluid into said mixing chamber;

wherein the first plenum means includes a fluid discharge end concentrically surrounded by the second plenum means to thereby cause said first plenum means to discharge the first annular wave of pressurized fluid into contact with the second annular wave of pressurized fluid such that said second annular wave of pressurized fluid contactably circumscribes said first annular wave of pressurized fluid;

wherein the particulate discharge end of the barrel is concentrically surrounded by the first plenum means, to thereby cause said discharge end to discharge the particulate material into contact with the first annular wave of pressurized fluid such that said first annular wave of pressurized fluid contactably circumscribes the discharged particulate material.

35. The system as defined in claim 34, wherein the mixing chamber comprises a nose cone having a wider opening and an opposing narrower opening and including an interior surface at least a portion of which tapers radially inwardly toward the narrower opening, and wherein the fluid discharge end of the first plenum means and the particulate discharge end of the barrel are substantially common to a single plane facing the wider opening of the nose cone, the narrower opening of the nose cone being configured for attachment to a conveying conduit, such that the first and second annular waves of pressurized fluid co-act with the auger means to cause the particulate material to be transported through the nose cone to the second location.

36. The system as defined in claim 34, wherein the particulate discharge end of the barrel and the second plenum means are axially slidable relative to each other to thereby enable a user to enhance movement of the particulate material by adjusting the relative positioning of said particulate discharge end and the second plenum means.

37. The system as defined in claim 34, wherein the first and second plenum means each have annular interior side walls the system further comprising:

first and second annular baffle means disposed about the annular interior side walls of the first and second injection means said first and second annular baffle means each including at least one gap formed therein for respectively channeling fluid flow of the first and second annular waves in a linear direction through the first and second plenum means, respectively.

38. The system as defined in claim 37, wherein the first baffle means is replaceable with (i) a first substitute baffle means having a lesser amount of gap space formed therein than the first baffle means, and (ii) a second substitute baffle means having a greater amount of gap space formed therein than the first baffle means, and wherein the second baffle means is replaceable with (i) a third substitute baffle means having a lesser amount of gap space formed therein than the second baffle means, and (ii) a fourth substitute baffle means having a greater amount of gap space formed therein than the second baffle means.

39. The system as defined in claim 34, wherein the auger means comprises a main auger having a distal end and an auger adapter replaceably attached at the distal end of main auger.

40. The system as defined in claim 39, wherein the auger adapter is replaceable with (i) a first substitute auger adapter having a lesser frequency of flights per lineal foot than the main auger, and (ii) a second substitute auger adapter having a greater frequency of flights per lineal foot than the main auger.

41. The system as defined in claim 34, wherein the first plenum means comprises a first plenum chamber having a first rear-end plate and at least a first fluid-injecting means disposed in communication with the first plenum chamber for injecting a first stream of pressurized fluid into said first plenum chamber and toward the first rear-end plate.

42. The system as defined in claim 41, wherein the second plenum means comprises a second plenum chamber having a second rear-end plate and at least a second fluid-injecting means disposed in communication with the second plenum chamber for injecting pressurized fluid into said second plenum chamber and toward the second rear-end plate.

43. The system as defined in claim 34, wherein the mixing chamber comprises a nose cone having a wider opening and an opposing narrower opening and including an interior surface at least a portion of which tapers radially inwardly toward the narrower opening, and wherein the nose cone is replaceably coupled at its wider opening to the second plenum means and wherein the narrower opening is configured to be removably coupled to the conveying conduit, said nose cone being replaceable with (i) a first substitute nose cone having a greater degree of taper than the original nose cone, and (ii) a second substitute nose cone having a lesser degree of taper than the original nose cone.

44. The system as defined in claim 43, wherein the interior surface of the nose cone comprises a concave surface.

45. The system as defined in claim 43, wherein the interior surface of the nose cone comprises a convex surface.

46. The system as defined in claim 34, wherein the auger means includes auger flights disposed around a central shaft, said flights including a lowest portion disposed on the shaft and extending outwardly from the shaft to terminate in a free outer edge, said flights further including a tapered cross section defined by opposing sides wherein at least one of said sides tapers from a wider lower portion of the flight backwardly toward the opposing side and outwardly to a free edge of the flight to define a tapered contacting face such that said free edge is narrower than the wider lower portion to thereby enhance deflection and transport of the particulate material by the flights.

47. The system as defined in claim 46, wherein the at least one tapered side of the auger flights comprises a concave surface.

48. The system as defined in claim 46, wherein the at least one tapered side of the auger flights comprises a convex surface.

49. The system as defined in claim 46, wherein all of the tapered contacting faces of the flights are facing toward the mixing chamber to thereby cause any particulate material which happens to fall onto the contacting faces to be deflected toward said mixing chamber.

50. The system as defined in claim 34, wherein the first and second plenum means each comprise means for injecting a pressurized gas into the nose cone under a pressure within a range of approximately 2 psi to 12 psi.

51. A system for conveying particulate material from a first location to a second location, the system comprising:

container means for holding the particulate material at the first location;

means for moving the particulate material out of the container means, the means for moving being configured for receiving particulate material from the container means and comprising an auger means rotatably disposed within an auger containment means, the auger containment means having a first end and a second end, a particulate seal being maintained between the auger means and the auger containment means to inhibit backflow of particulate material such that as the auger means operates the particulate material moves through the means for moving, the auger means having a first number of flights over its length and the auger means being selectively replaceable by (i) a first substitute auger means having a length which remains within the auger containment means and (ii) a second substitute auger means which extends out of the second end of the auger containment means;

first plenum means substantially surrounding the means for moving, the first plenum means terminating at the second end of the auger containment means;

first baffle means, positioned in the first plenum means, for selectively controlling fluid flow through the first plenum means;

first port means for injecting a fluid into the first plenum means, the first port means oriented at a first angle with respect to a central axis of the first plenum means;

second plenum means substantially surrounding the second end of the auger containment means and surrounding at least a portion of the first plenum means;

second baffle means, positioned in the second plenum means, for selectively controlling fluid flow through the second plenum means;

second port means for injecting a fluid into the second plenum means, the second port means oriented at a second angle with respect to a central axis of the second plenum means;

means for supplying pressurized fluid into the first and second port means;

transition means for receiving the fluid flowing out of the first plenum means and the second plenum means and for receiving the particulate material flowing out of the auger containment means, the transition means narrowing from a first diameter at a first end, the first diameter being at least as great as the diameter of the second plenum means, to a smaller second diameter to substantially convey the particulate material to a conduit leading to the second location.

52. A system for conveying particulate material from a first location to a second location, the system comprising:

a mixing chamber having a wide opening and an opposing narrower opening;

moving means including an elongate cylindrical barrel having a receiving portion and an opposing particulate discharge end disposed in communication with the wide opening of the mixing chamber, said moving means further including an auger rotatably disposed within the barrel, said auger including helical auger flights, wherein the barrel further includes an opening formed in the receiving portion thereof above the auger for receiving particulate material into the barrel and onto the auger, such that rotation of the auger causes movement of the particulate material along the barrel and into the mixing chamber;

outer injection means surrounding the barrel and being disposed in communication with the wide opening of the mixing chamber for injecting an outer annular wave of pressurized fluid therein such that the outer annular wave of pressurized fluid co-acts with the moving means to cause the particulate material to be transported through the mixing chamber to a second location;

wherein the flights of the auger include at least a first section of flights residing between second and third sections of flights which vary in pitch and frequency with said first section of flights to thereby produce a pulsing movement of the particulate material within the barrel.

53. The system as defined in claim 52, wherein the helical auger flights vary in pitch and frequency across approximately an initial fifty percent of the opening in the barrel followed by a section of flights which are substantially uniform in pitch and frequency.

54. The system as defined in claim 53, further including a variable speed motor operably attached to the auger for rotating the auger to thereby enable a user to adjust the rotational velocity of the auger so as to enhance transport of the particulate material by the auger.

55. A method for conveying particulate material from a first location to a second location, said method comprising the steps of:

(a) placing particulate material into an auger chamber having a particulate discharge end and an auger means rotatably disposed in the auger chamber, and rotating the auger means to thereby convey the particulate material along the auger chamber and out of the particulate discharge end and into a mixing chamber;

(b) conveying first and second concentric annular waves of pressurized fluid along flow movement paths and injecting said waves into the mixing chamber such that said waves co-act with particulate discharging action of the auger means to thereby cause the particulate material to be transported through the mixing chamber to a second location.

56. The method as defined in claim 55, further comprising the step of:

(c) placing first and second annular baffle means into the flow movement paths of the first and second concentric annular waves of pressurized fluid, respectively, said first and second baffle means each including at least one gap formed therein to thereby cause said first and second baffle means to respectively channel fluid flow of the first and second annular waves in a linear direction toward the mixing chamber.

57. The method as defined in claim 56, herein step (c) further comprises replacing at least one of the first and second annular baffle means with substitute baffle means having a lesser amount of gap space formed therein than the replaced baffle means.

58. The method as defined in claim 56, wherein step (c) further comprises replacing at least one of the first and second annular baffle means with substitute baffle means having a greater amount of gap space formed therein than the replaced baffle means.

59. The method as defined in claim 55, wherein step (a) further comprises placing the particulate material into an auger chamber having an auger means comprising a main auger having a distal end and an auger adapter replaceably attached at the distal end of main auger.

60. The method as defined in claim 59, further comprising the step of:

(d) replacing the auger adapter with a first substitute auger adapter having a lesser frequency of flights per lineal foot than the main auger.

61. The method as defined in claim 59, a further comprising the step of:

(d) replacing the auger adapter with a second substitute auger adapter having a greater frequency of flights per lineal foot than the main auger.

62. The method as defined in claim 56, wherein step (a) further comprises conveying the particulate material into a mixing chamber comprising a nose cone having a wider portion and a narrower portion and an interior surface which tapers radially inwardly from the wider portion to the narrower portion.

63. The method as defined in claim 62, further comprising the step of:

(e) replacing the nose cone with a first substitute nose cone having a greater degree of taper than the original nose cone.

64. The method as defined in claim 62, further comprising the step of:

(e) replacing the nose cone with a second substitute nose cone having a lesser degree of taper than the original nose cone.

* * * * *